United States Patent
Dionisi

(10) Patent No.: US 10,498,568 B2
(45) Date of Patent: Dec. 3, 2019

(54) METHOD AND DEVICE FOR SELECTING AN OPERATING MODE OF A CABLE MODEM

(71) Applicant: SAGEMCOM BROADBAND SAS, Rueil Malmaison (FR)

(72) Inventor: Florent Dionisi, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 0 days.

(21) Appl. No.: 16/469,860

(22) PCT Filed: Dec. 14, 2017

(86) PCT No.: PCT/EP2017/082919
§ 371 (c)(1),
(2) Date: Jun. 14, 2019

(87) PCT Pub. No.: WO2018/109121
PCT Pub. Date: Jun. 21, 2018

(65) Prior Publication Data
US 2019/0312762 A1  Oct. 10, 2019

(30) Foreign Application Priority Data
Dec. 16, 2016 (FR) ...................... 16 62635

(51) Int. Cl.
*H04B 3/00* (2006.01)
*H04L 27/00* (2006.01)
*H04L 12/28* (2006.01)

(52) U.S. Cl.
CPC ...... *H04L 27/0006* (2013.01); *H04L 12/2898* (2013.01); *H04L 27/0008* (2013.01)

(58) Field of Classification Search
CPC ............. H04L 27/0006; H04L 12/2898; H04L 27/0008
(Continued)

(56) References Cited

U.S. PATENT DOCUMENTS

2015/0358669 A1* 12/2015 Seo .................. H04N 21/42676
725/111
2015/0365732 A1  12/2015 Clark

FOREIGN PATENT DOCUMENTS

EP  2 991 248 A2  3/2016

OTHER PUBLICATIONS

Jan. 17, 2018 International Search Report issued in International Patent Application No. PCT/EP2017/082919.
(Continued)

*Primary Examiner* — Zewdu A Kassa
(74) *Attorney, Agent, or Firm* — Oliff PLC; R. Brian Drozd

(57) ABSTRACT

A method for selecting an operating mode of a cable modem between first and second operating modes, the first operating mode using a first standard and first and second frequency bands separated by a third frequency band, the second operating mode using a fifth frequency band according to a second standard. The cable modem goes into the second operating mode and analyses signals included in at least the part of the fifth frequency band that includes the third frequency band which determines whether signals analyzed are not signals in accordance with the first or second standard and goes into a data transmission and reception mode according to the second standard if signals analyzed are not signals in accordance with the first and second standards and are not included in the third frequency band.

12 Claims, 4 Drawing Sheets

(58) Field of Classification Search
USPC .................................. 375/257, 316, 219, 295
See application file for complete search history.

(56) References Cited

OTHER PUBLICATIONS

"DOCSIS.31 Application Note" Rhode & Schwarz 31.1; pp. 1-24, Feb. 26, 2015.

* cited by examiner

METHOD AND DEVICE FOR SELECTING AN OPERATING MODE OF A CABLE MODEM

The present invention relates to a method and device for selecting the operating mode of a cable modem between a first mode in accordance with a first standard and a second operating mode in accordance with a second standard.

"Data Over Cable Service Interface Specification" (DOCSIS) is a set of standards that defines the rules and the interface, communication and configuration protocols for data-transport and internet-access systems using the old coaxial-cable television networks. It allows the addition of data transfer, at high speed, to the existing cable television systems.

DOCSIS is used by the cable television operators to provide access to the internet on their existing HFC (hybrid fibre coaxial) infrastructure which is or was used for cable television.

A cable modem is a type of modem that makes it possible to connect to the internet while being connected to a cable television network. The cable modem is bidirectional and uses only one coaxial cable for both directions, downstream for the data from the network to the user and upstream for the data from the user to the network. The network may consist solely of coaxial cables or be hybrid fibre coaxial.

The DOCSIS 3.0 standard uses a quadrature amplitude modulation (QAM) carrier of 64 or 256 QAM able to offer a transmission rate of 30 Mbit/s to 800 Mbit/s to the user.

Two 6 MHz or 8 MHz bandwidths are used.

With the DOCSIS 3.1 standard, for transferring data, the former division into channels (of 6 or 8 MHz) inherited from cable television is abandoned in favour of OFDM/OFDMA modulation able to use a major part or even the whole of the bandwidth of the coaxial cable.

More precisely, the low part of the frequency band is used for the upstream direction and the high part for the downstream direction.

On the downlink, a plurality of (carrier) channels can, in DOCSIS 3.0, be aggregated (grouped) to the same subscriber; this makes it possible to achieve 200 Mbit/s in the downlink direction by aggregating 4 channels and up to 1200 Mbit/s by using 24 channels.

At the present time, the DOCSIS 3.1 version is in the process of being deployed. This technical development requires architectural migration and important hardware. During the transition, the network will have to be compatible with the DOCSIS 3.0 standard and at the same time the DOCSIS 3.1 standard.

Deployment towards the DOCSIS 3.1 version requires an increase in or reallocation of the frequency spectrum of the network and requires exact knowledge of the nature of the already existing signals, such as television or radio signals, on the network of the operator and their position in the frequency spectrum.

Operators wishing to switch all or part of their network to the DOCSIS 3.1 version, which relies on a frequency plane different from that which they have already deployed, are thus confronted with the problem of mapping of the local out-of-band signals.

The aim of the present invention is to solve the drawbacks of the prior art by proposing a method and device that allow selection of an operating mode of a cable modem between a first operating mode in accordance with a first standard and a second operating mode in accordance with a second standard that is suited to the various signals present on a coaxial-cable television network.

To this end, according to a first aspect, the invention proposes a method for selecting an operating mode of a cable modem between first and second operating modes, the first operating mode allowing reception of data in a downlink occupying a first frequency band and the transmission of data in an uplink occupying a second frequency band, the first and second frequency bands being separated by a third frequency band, the second operating mode allowing the reception of data in a downlink occupying a fourth frequency band and the transmission of data in an uplink occupying a fifth frequency band, the fourth and fifth frequency bands being separated by a sixth frequency band, the third frequency band lying in the fifth frequency band and the sixth frequency band lying in the first frequency band, the data transmitted and received being in accordance with a first and/or second standard, characterised in that the method comprises the steps, performed by the cable modem, of:

setting the cable modem in the second operating mode,
    analysing the signals included in at least the part of the fifth frequency band comprising the third frequency band,
    determining whether signals analysed are not signals in accordance with the first or second standard,
    setting the cable modem in a data transmission and reception mode according to the second standard if signals analysed are not signals in accordance with the first and second standards and are not included in the third frequency band.

The invention also relates to a device for selecting an operating mode of a cable modem between first and second operating modes, the first operating mode allowing reception of data in a downlink occupying a first frequency band and the transmission of data in an uplink occupying a second frequency band, the first and second frequency bands being separated by a third frequency band, the second operating mode allowing the reception of data in a downlink occupying a fourth frequency band and the transmission of data in an uplink occupying a fifth frequency band, the fourth and fifth frequency bands being separated by a sixth frequency band, the third frequency band lying in the fifth frequency band and the sixth frequency band lying in the first frequency band, the data transmitted and received being in accordance with a first and/or second standard, characterised in that the method comprises the steps, performed by the cable modem, of:

setting the cable modem in the second operating mode,
    analysing the signals included in at least the part of the fifth frequency band comprising the third frequency band,
    determining whether signals analysed are not signals in accordance with the first or second standard,
    setting the cable modem in a data transmission and reception mode according to the second standard if signals analysed are not signals in accordance with the first and second standards and are not included in the third frequency band.

Thus it is possible to adapt the functioning of a cable modem to the various signals present on a coaxial-cable television network and to favour, as soon as this is opportune, the setting of the cable modem in the second operating mode and in the data transmission and reception mode according to the second standard.

According to a particular embodiment of the invention, the analysis of the signals is carried out in the part of the fifth band comprising the third frequency band and the frequencies higher than the third frequency band.

Thus the setting of the cable modem in the second operating mode and in the data transmission and reception mode according to the second standard is suited to the various signals present on a coaxial-cable television network.

According to a particular embodiment of the invention, the cable modem is set in the first operating mode and in the data transmission and reception mode according to the first standard if the frequency band occupied by the signals analysed that are not signals in accordance with the first and second standards is higher than a first predetermined frequency-band value of the part of the fifth band comprising the third frequency band and the frequencies higher than the third frequency band.

Thus the setting of the cable modem or not in the second operating mode and in the data transmission and reception mode according to the second standard is suited to the various signals present on a coaxial-cable television network.

According to a particular embodiment of the invention, the method further comprises the steps of:
  analysing the signals included in the fourth frequency band,
  determining whether signals analysed are not signals in accordance with the first or second standard.

Thus the setting of the cable modem in the second operating mode and in the data transmission and reception mode according to the second standard is suited to the various signals present on a coaxial-cable television network.

According to a particular embodiment of the invention, setting the cable modem in the second operating mode and the data transmission and reception mode according to the second standard is further performed if the frequency band occupied by the signals analysed that are not signals in accordance with the first and second standards is lower than the first predetermined frequency-band value of the part of the fifth band comprising the third frequency band and the frequencies higher than the third frequency band and if the frequency band occupied by the signals analysed that are not signals in accordance with the first and second standards is lower than a second predetermined frequency-band value of the fourth frequency band, and the cable modem is set in the first operating mode and in the data transmission and reception mode according to the first standard if the frequency band occupied by the signals analysed that are not signals in accordance with the first and second standards is higher than the second predetermined frequency-band value of the fourth frequency band.

Thus the setting of the cable modem in the second operating mode and in the data transmission and reception mode according to the second standard is suited to the various signals present on a coaxial-cable television network.

According to a particular embodiment of the invention, the method further comprises the steps of:
  seeking a downlink primary channel of one of the standards, the downlink primary channel making it possible to obtain information making it possible to map the channels of the fourth frequency band and of the fifth frequency band,
  mapping the fourth and fifth frequency bands.

Thus the setting of the cable modem in the second operating mode and in the data transmission and reception mode according to the second standard is suited to the various signals present on a coaxial-cable television network.

According to a particular embodiment of the invention, the method further comprises the step of transferring information representing the signals analysed.

According to a particular embodiment of the invention, setting the cable modem in the second operating mode is carried out on reception of a command from terminal equipment.

Thus the setting of the cable modem in the second operating mode and in the data transmission and reception mode according to the second standard is effected in a centralised manner by the operator of the coaxial-cable television network and is suited to each cable modem.

According to a particular embodiment of the invention, setting the cable modem in a data transmission and reception mode according to the first or second standard is determined by the cable modem.

According to a particular embodiment of the invention, the first standard is the DOCSIS 3.0 standard and the second standard is the DOCSIS 3.1 standard.

The invention also relates to the computer programs stored on an information carrier, said programs comprising instructions for implementing the previously described methods when they are loaded into and executed by a computer system.

The features of the invention mentioned above, as well as others, will emerge more clearly from a reading of the following description of an example embodiment, said description being given in relation to the accompanying drawings, among which:

Figure 1:
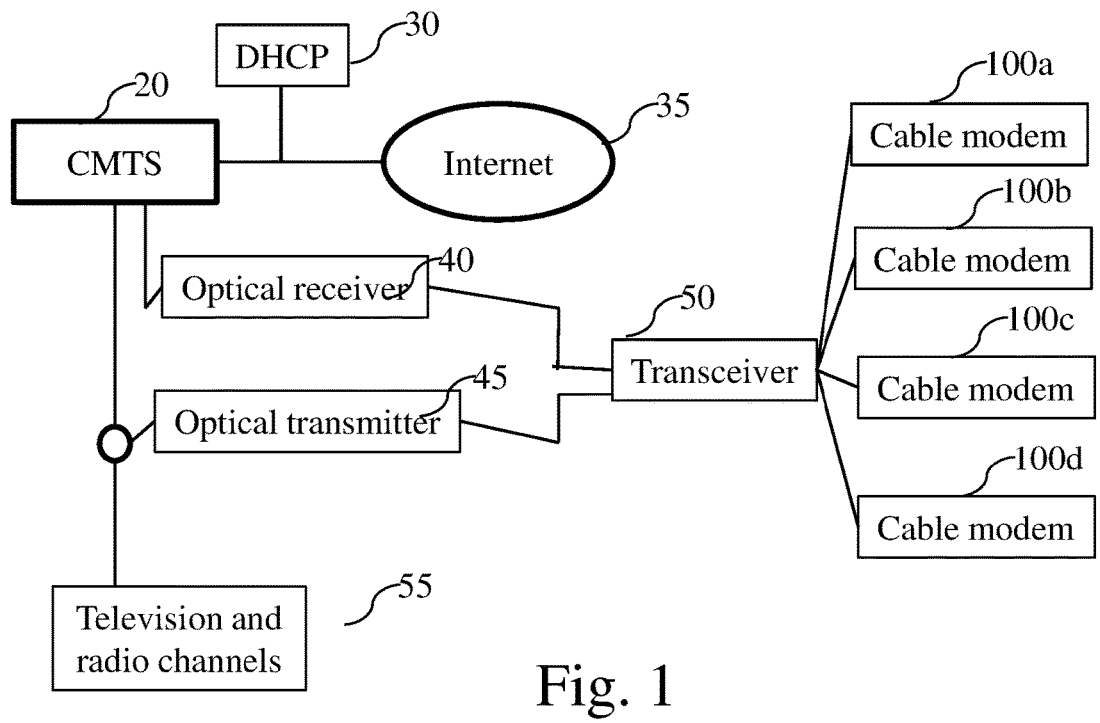
FIG. 1 shows a communication system for transporting data and for access to the internet using the old coaxial-cable television networks in which the present invention is implemented.

The system comprises CMTS terminal equipment denoted 20. CMTS is the acronym for the English term "cable modem termination system".

The CMTS terminal equipment 20 is equivalent to the DSLAM (digital subscriber line access multiplexer) of the xDSL (digital subscriber line) technology. The CMTS terminal equipment 20 is connected to a DHCP server 30 and to the internet 35.

DHCP is the acronym for the English term "Dynamic Host Configuration Protocol". The DHCP server 30 allocates to the cable modems 100 and optionally to the computer of the client the IP addresses thereof.

The CMTS terminal equipment 20 is the device to which the uplink and downlink ports are connected. To provide bidirectional communication on an optical fibre, it is necessary to use at least two wavelengths, one per transmission direction, for the downlink composed of a transceiver 50 and an optical transmitter 45, and for the downlink composed of the transceiver 50 and an optical receiver 40. The coaxial part is situated between the transceiver 50 and the various cable modems 100a to 100d.

The television and/or radio channels are delivered to the cable modems 100 by broadcast devices 55 by means of the optical transmitter 45 in a so-called exclusion frequency band, provided for by the DOCSIS standard or standards.

The exclusion frequency band of the DOCSIS 3.1 standard is different from the exclusion frequency band of the DOCSIS 3.0 standard.

Figure 2:
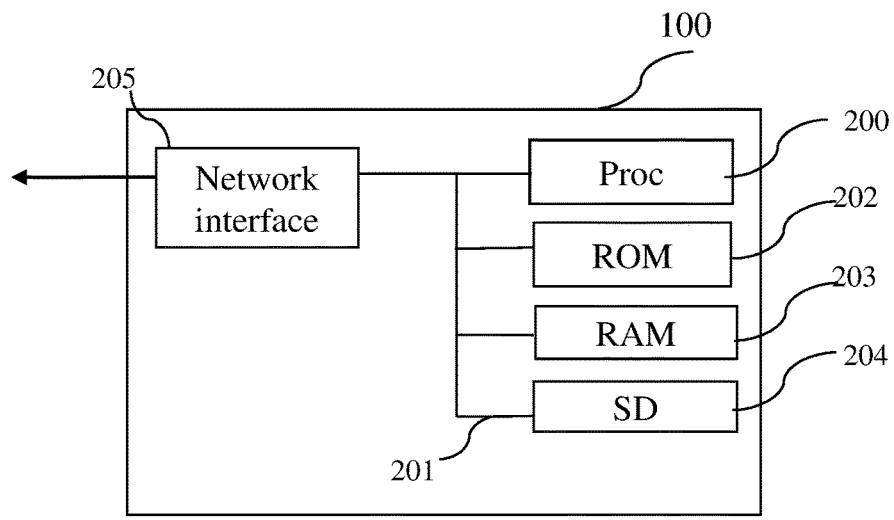
FIG. 2 shows an example of architecture of a cable modem in which the present invention is implemented.

FIG. 2 shows an example of architecture of a cable modem in which the present invention is implemented.

The cable modem 100 comprises:
- a processor, microprocessor or microcontroller 200;
- a volatile memory 203;
- a non-volatile memory 202;
- optionally a storage medium reader 204, such as an SD card (secure digital card) reader or a hard disk for storing the documents processed by the present invention;
- a network interface 205,
- a communication bus 201 connecting the processor 200 to the ROM memory 203, to the RAM memory 203, to the storage medium reader 204 and to the network interface 205.

The processor 200 is capable of executing instructions loaded into the volatile memory 203 from the non-volatile memory 202, from an external memory (not shown), from a storage medium, such as an SD card or the like, or a communication network. When the cable modem 100 is powered up, the processor 200 is capable of reading instructions from the volatile memory 203 and executing them. These instructions form a computer program that causes the implementation, by the processor 200, of all or part of the method described in relation to FIGS. 4 and 5.

Figure 4:
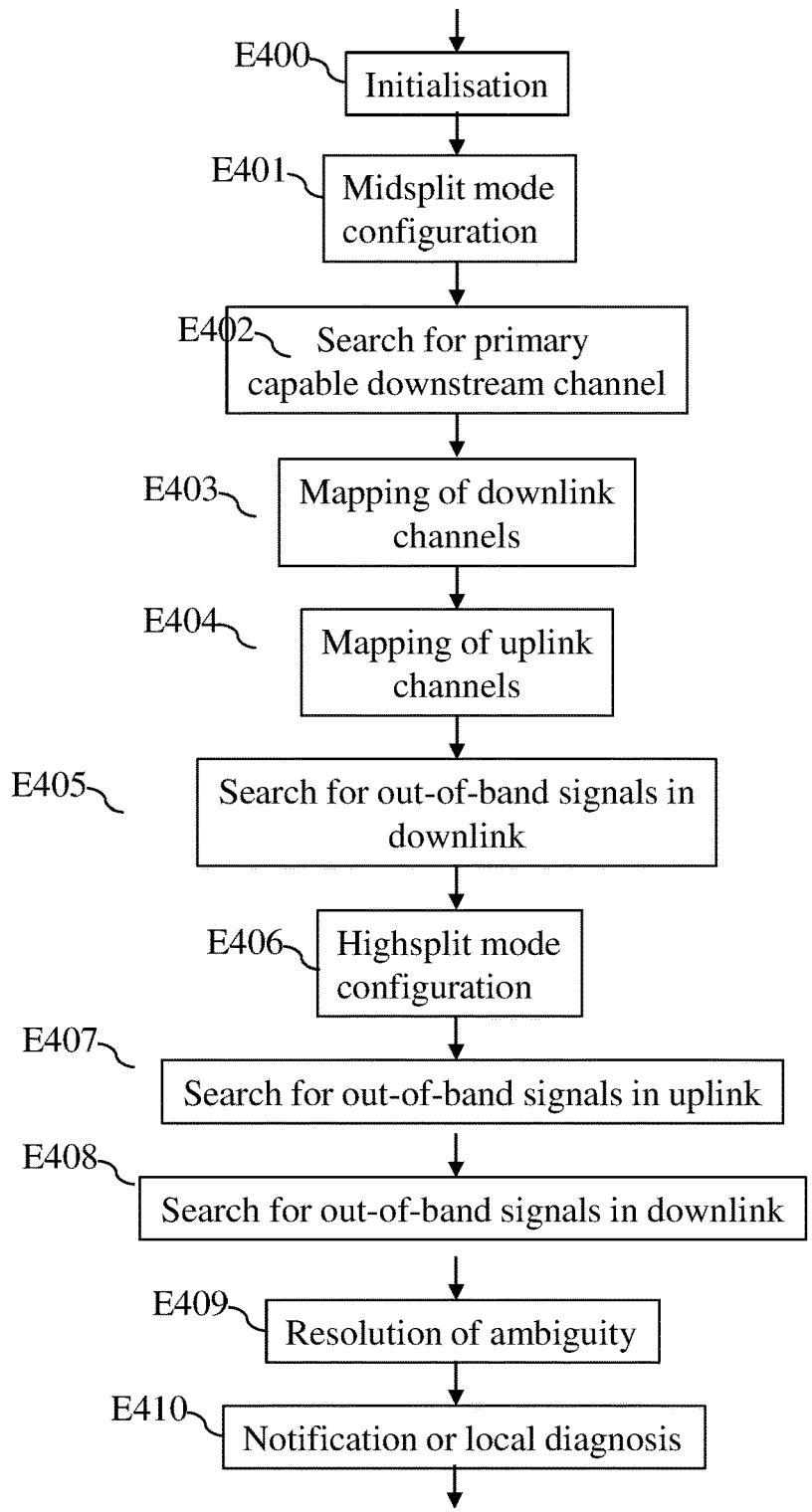
FIG. 4 shows an example of an algorithm executed by a cable modem according to the present invention.
Figure 5:
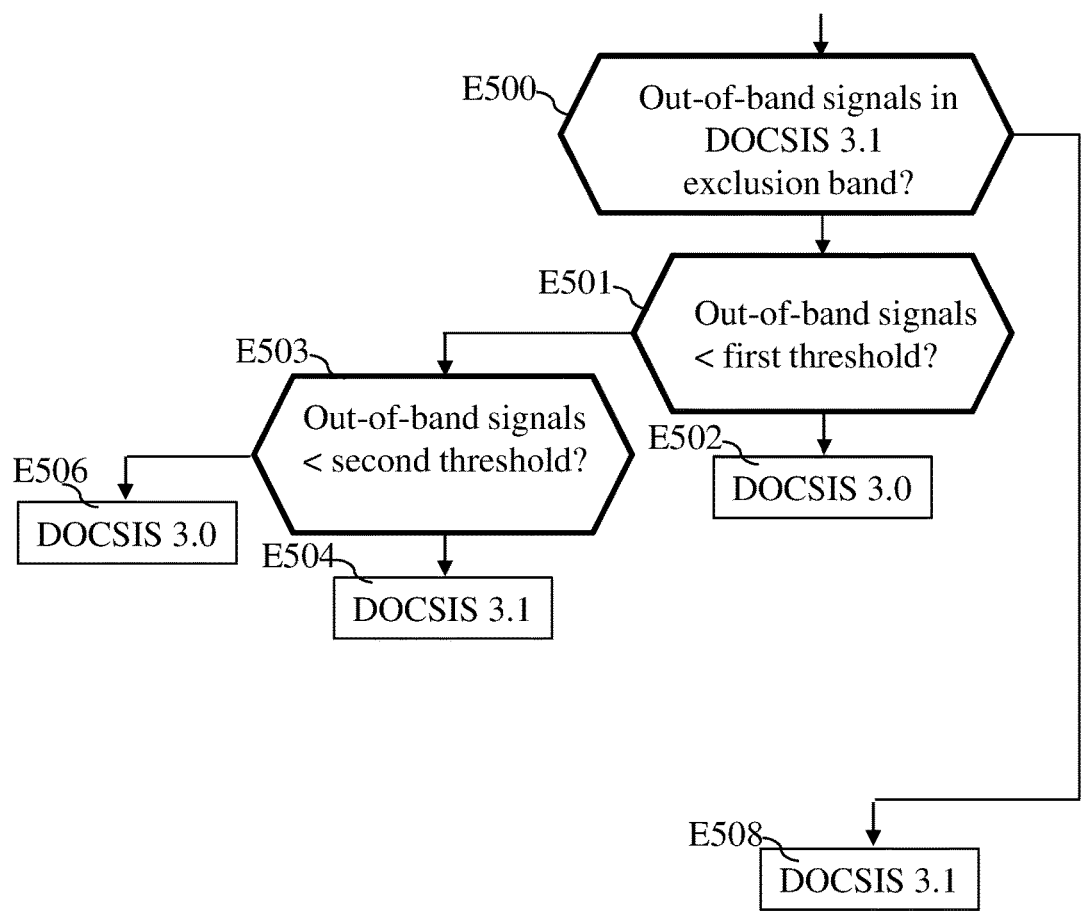
FIG. 5 shows an example of an algorithm executed by a cable modem according to a particular embodiment of the present invention.

All or part of the method described in relation to FIGS. 4 and 5 can be implemented in software form by the execution of a set of instructions by a programmable machine such as a DSP (digital signal processor) or a microcontroller or be implemented in hardware form by a machine or a dedicated component, such as an FPGA (field-programmable gate array) or an ASIC (application-specific integrated circuit).

The network interface 205 is able to modulate and demodulate signals with the modulation defined by the DOCSIS 3.0 and DOCSIS 3.1 standards.

For example, the network interface 205 is able to modulate and demodulate the following signals: BPSK (the acronym for Binary Phase Shift Keying), QPSK (the acronym for Quaternary Phase Shift Keying), 8-QAM (the acronym for Quadrature Amplitude Modulation), 16-QAM, 32-QAM, 64-QAM, 128-QAM, 256-QAM, 512-QAM, 1024-QAM, 2048-QAM and 4096-QAM.

For example, the network interface 205 comprises a duplexer that can be configured with two modes.

A first operating mode, referred to as Midsplit, corresponding to the DOCSIS 3.0 standard, functions in the 5-85 MHz frequency band for the uplink and in the 104-1218 MHz frequency band for the downlink.

A second operating mode referred to as Highsplit, corresponding to the DOCSIS 3.1 standard, functions in the 5-204 MHz frequency band for the uplink and in the 254-1218 MHz frequency band for the downlink.

An operator wishing to extend his frequency plane with this type of product deployed on its subscriber equipment is confronted with the problem of allocating additional frequencies for the allocation of DOCSIS 3.1 channels.

FIG. 3 show examples of spectral planes of the DOCSIS 3.0 and 3.1 standards in which out-of-band signals are liable to exist.

Figure 3A:
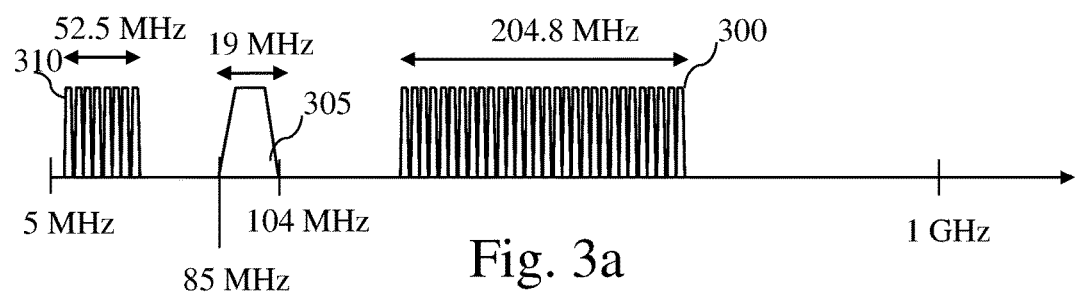
FIG. 3 show examples of spectral planes of the DOCSIS 3.0 and 3.1 standards in which out-of-band signals are liable to exist.

FIG. 3a shows an example of a spectral plane of a network in which the DOCSIS 3.0 standard is implemented.

In the example in FIG. 3a, the uplink 310 lies between 5 and 50 MHz or even up to 85 MHz, and the downlink 300 lies in a frequency range between 104 MHz and 1002 MHz.

The downlink 300 occupies a first frequency band and the uplink 310 occupies a second frequency band.

The frequency bands for the uplink and downlink are separated by an exclusion band 305 lying between 85 and 104 MHz.

The exclusion band 305 occupies a third frequency band.

These frequency ranges are defined by the DOCSIS 3.0 standard in the PHY D3.0 (CM-SP-PHY v3.0) specification and DOCSIS 3.1 standard in PHY D.3.1 (CM-SP-PHY v3.1) paragraph 7.2.1.

Figure 3B:
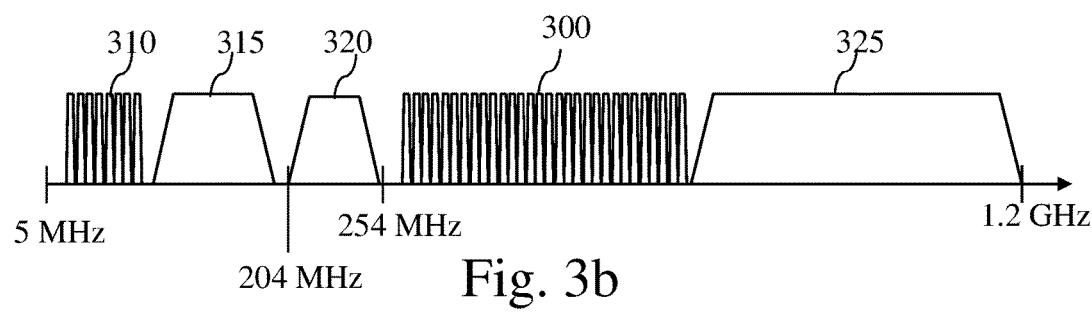

FIG. 3b shows an example of a spectral plane of a network in which the DOCSIS 3.1 standard is implemented and which coexists with signals in accordance with the DOCSIS 3.0 standard.

The signals denoted 310 and 300 represent respectively the DOCSIS 3.0 signals transmitted in uplink and downlink.

In the example in FIG. 3b, the uplink 310 and 315 lies between 5 and 204 MHz, and the downlink 300 and 325 lies in a frequency range between 254 MHz and 1.2 GHz.

The downlink 300 and 325 occupies a fourth frequency band and the uplink 310 and 315 occupies a fifth frequency band.

The frequency bands for the uplink and downlink are separated by an exclusion band 320 lying between 204 and 254 MHz.

The exclusion band 320 occupies a sixth frequency band.

The DOCSIS 3.1 standard offers a frequency band higher than that of the DOCSIS 3.0 standard. The DOCSIS 3.1 standard makes it possible to transfer, in the uplink, data according to the DOCSIS 3.1 standard in a frequency range denoted 310 and 315. The DOCSIS 3.1 standard makes it possible to transfer, in the downlink, data according to the DOCSIS 3.1 standard in a frequency range denoted 300 and 325.

Figure 3C:
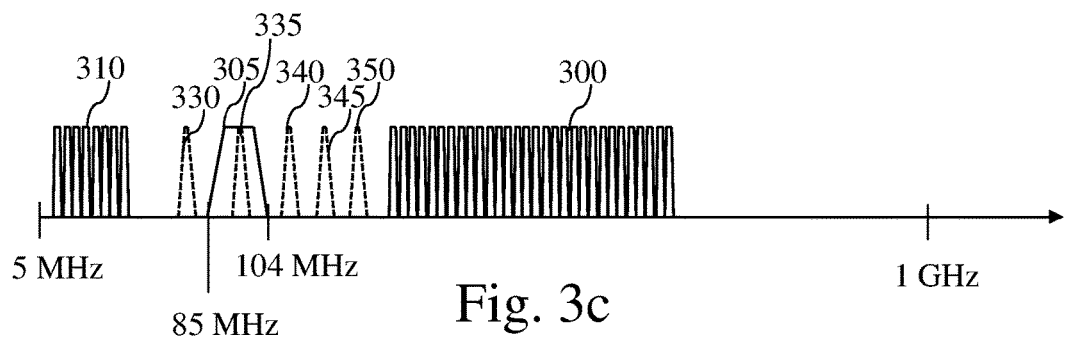

FIG. 3c shows an example of a spectral plane of a network in which the DOCSIS 3.0 standard is implemented and which comprises out-of-band signals.

An out-of-band signal 330, 335, 340, 345 or 350 is a signal that is not in accordance with the DOCSIS 3.0 standard. It is for example noise, or a television or radio signal.

Out-of-band signals do not interfere with transmissions in accordance with the DOCSIS 3.0 standard in the uplinks and downlinks as long as they are not superimposed on the DOCSIS 3.0 signals.

Because of the difference in the frequency plane of the DOCSIS 3.0 or 3.1 exclusion bands, the out-of-band signals may sometimes interfere with the transmissions in accordance with the DOCSIS 3.1 standard in the uplink.

FIG. 4 shows an example of an algorithm executed by a cable modem according to the present invention.

The present algorithm is executed for example on request by the CMTS terminal equipment 20 when the operator wishes to carry out a diagnosis of the frequency plane in order possibly to proceed with a reallocation thereof or to switch from DOCSIS 3.0 operating mode to DOCSIS 3.1.

The present algorithm is in this example executed by the processor 200 of the cable modem 100.

At step E400, the processor 200 commands the initialisation of the network interface 205. The initialisation may be identical to that carried out when the cable modem 100 is powered up or to that carried out during software restarting of the cable modem 100 or consist of a reinitialisation of the software layers relating to the DOCSIS 3.0 or 3.1 standards.

At step E401, the processor 200 configures the network interface 205 in the mode known as Midsplit, that is to say in an operating mode in accordance with the DOCSIS 3.0 standard.

It should be noted here that steps E406 to E408 may or may not be performed before step E401 as desired.

At step E402, the processor 200 commands the search for a primary capable downstream channel in the frequency band of the downlink.

This search phase is for example in accordance with the one defined in the DOCSIS MULPI 3.0 and 3.1 specifications and makes it possible to identify the primary capable downstream channels for example via the SYNC message transmission or via the detection of the PHY Link Channel (PLC) preambles on primary OFDM channels.

A primary capable downstream channel carries SYNC messages, MDD messages, and UCD and MAP messages that are required by each cable modem 100 for registering on the DOCSIS network as well as for obtaining the necessary information for being able to transmit and receive data.

When a primary capable downstream channel is found, the network interface 205 is able to establish a mapping of the DOCSIS signals configured for the downlink and the uplink.

The network interface 205 uses the descriptors transmitted by the terminal DOCSIS system (CMTS) on the operator side that broadcasts this mapping via the DCD (downstream channel descriptor), OCD (OFDM Channel Descriptor) and DPD (Downstream Profile Descriptor) messages.

At step E403, the network interface 205 establishes a mapping of the channels of the downlink.

At step E404, the network interface 205 establishes a mapping of the channels of the uplink.

The mapping of the channels of the uplink can be established from information sent by the operator, via the CMTS 20.

The CMTS 20 transmits UCD (upstream channel descriptor) messages describing the uplink channel and MAP (upstream bandwidth allocation MAP) messages describing the channels of the uplink.

The UCD messages described in the MULPI 3.1 specification make it possible to describe the characteristics of the channels that are used on the frequency range of the uplink.

At step E404, the processor 200 controls the network interface so that the latter analyses at least the part of the first frequency band comprising the sixth frequency band, or even the whole of the first frequency band comprising the frequency band comprising the downlink in the Midsplit mode. It should be noted here that the frequency band analysed comprises the exclusion band of the Highsplit mode. This configuration makes it possible to know the signals present in the exclusion band of the Highsplit mode.

This step makes it possible to detect all the signals present on the frequency band analysed. By finely digitising the whole of the band, it is possible to establish the physical characteristics of the signals and therefore to establish a list of unambiguous signals with, at a minimum for each, a channel width, a position of the channel, a spectral power density that can be normalised over a frequency width of 1.6 MHz in order to facilitate the comparison with the signals in accordance with the DOCSIS 3.0 and DOCSIS 3.1 standards, a maximum spectral power density, a mean spectral power density and a minimum spectral power density.

At step E406, the processor 200 configures the network interface 205 in the mode known as Highsplit.

At step E407, the processor 200 controls the network interface so that the latter analyses at least the part of the fifth frequency band comprising the third frequency band, or the part of the fifth frequency band comprising the third frequency band and the frequencies higher than the third frequency band or the entire frequency band comprising the frequency band comprising the uplink in the Highsplit mode.

It should be noted here that the frequency band analysed comprises the exclusion band of the Midsplit mode. This configuration makes it possible to know the signals present in the exclusion band of the Midsplit mode.

This step makes it possible to detect all the signals present on the frequency band analysed. By finely digitising the whole of the band, it is possible to establish the physical characteristics of signals in the exclusion band of the Midsplit mode and those that are close to the exclusion band of the Midsplit mode, and therefore to establish a list of ambiguous signals with, for each at a minimum, a channel width, a position of the channel, a spectral power density that can be normalised over a frequency width of 1.6 MHz in order to facilitate the comparison with the signals in accordance with the DOCSIS standards, a maximum spectral power density, a mean spectral power density and a minimum spectral power density.

The processor 200 at the end of steps E405 and E408 thus has knowledge of the signals included in the exclusion bands of the Midsplit and Highsplit modes and situated in the vicinity thereof.

At the following step E409, the processor 200 establishes, for each signal detected at steps E405 to E408, a diagnosis that makes it possible to remove any ambiguity as to the nature of these signals and to confirm that they are not signals in accordance with the DOCSIS standards.

From the mapping of the signals carried out at steps E403 and E404 and the signals detected at steps E405 and E408, the processor 200 can determine out-of-band signals that are or are not superimposed on the mapped DOCSIS signals.

If there is an overlap between these two sets of signals, or if the configuration transmitted by the CMTS 20 does not correspond to the signals detected at steps E405 to E408, there is ambiguity about the nature of the signals.

The processor 200 controls the network interface 205 so that the latter resolves the ambiguities detected. For example, the network interface 205 analyses the signals corresponding to the ambiguities detected by analysing the physical characteristics of the signals and/or by analysing these signals at the MAC layer.

The following specifications: DOCSIS PHY, DOCSIS DRFI, ITU-T Recommendation J.83 Annex B for North America and ETSI EN 300 429 V1.2.1 for Europe, define precisely the electrical characteristics, the structure of the physical frames, the coding of the channel and the modulation thereof.

These specifications describe the way in which the various modulations used by a DOCSIS channel are designed.

The network interface 205 checks whether the characteristics such as the spectral power density and the channel width agree or not with a DOCSIS signal, whether it is possible to demodulate the signal with a modulation included in the DOCSIS 3.0 or 3.1 standard, whether the error correction methods provided for by the DOCSIS standards work, and whether the synchronisation signals provided for by the DOCSIS standards are present.

If one of these characteristics does not agree with those of a DOCSIS 3.0 and 3.1 signal, the resolution of ambiguity may conclude that it is a case of an out-of-band signal.

The method for resolving ambiguity at the MAC layer assumes that the signal received by the cabled modem 100 is in accordance with the characteristics of the DOCSIS physical layer.

If the physical layer does not remove the ambiguity, the following method makes it possible to remove any ambiguity by scrutinising the messages transmitted by the CMTS 20 in at least one primary capable downstream channel.

It is a case in particular of scrutinising the arrival of the messages listed at step E403. If the messages expected are not in accordance with the DOCSIS 3.0 standard, then the resolution method can remove the ambiguity.

At step E410, the processor 200 commands the transfer to the CMTS 20, by means of the uplink, of the list of all the signals recognised as out of band at step 408, that is to say that do not correspond to signals in accordance with the DOCSIS 3.0 and 3.1 standards, and/or executes the algorithm in FIG. 5.

Optionally, a response message is received from the CTMS 20 indicating to the processor 200 into which operating mode the latter must go.

FIG. 5 shows an example of an algorithm executed by a cable modem according to a particular embodiment of the present invention.

The present invention is in this example executed by the processor 200 of the cable modem 100.

At step E500, the processor 200 checks whether signals recognised as out of band at step 408, that is to say that do not correspond to signals in accordance with the DOCSIS 3.0 and 3.1 standards, are included in the DOCSIS 3.1 exclusion band. If so, the processor 200 moves to step E501. If not, the processor 200 moves to step E508.

At step E508, the processor 200 configures the network interface 205 in the so-called Highsplit mode or in other words so that the latter functions according to the DOCSIS 3.1 standard.

At step E501, the processor 200 checks whether the frequency band occupied by the signals recognised as out of band at step 408, that is to say that do not correspond to signals in accordance with the DOCSIS 3.0 and 3.1 standards, is lower than a first predetermined frequency-band value of the part of the fifth band comprising the third frequency band and the frequencies higher than the third frequency band. For example, the first predetermined frequency-band value is equal to 50%.

If so, the processor 200 moves to step E503, if not, the processor 200 passes to step E502.

At step E502, the processor 200 configures the network interface 205 in the so-called Midsplit mode or in other words so that the latter functions according to the DOCSIS 3.0 standard.

At step E503, the processor 200 checks whether the frequency band occupied by the signals recognised as out of band, that is to say that do not correspond to signals in accordance with the DOCSIS 3.0 and 3.1 standards, is lower than a second predetermined frequency-band value of the fourth frequency band. For example, the second predetermined frequency-band value is equal to 20%.

If so, the processor 200 moves to step E504. If not, the processor 200 moves to step E506.

At step E504, the processor 200 configures the network interface 205 in the so-called Highsplit mode or in other words so that the latter functions according to the DOCSIS 3.1 standard.

At step E506, the processor 200 configures the network interface 205 in the so-called Midsplit mode or in other words so that the latter functions according to the DOCSIS 3.0 standard.

The invention claimed is:

1. A method for selecting an operating mode of a cable modem between first and second operating modes, the first operating mode allowing reception of data in a downlink occupying a first frequency band and the transmission of data in an uplink occupying a second frequency band, the first and second frequency bands being separated by a third frequency band, the second operating mode allowing the reception of data in a downlink occupying a fourth frequency band and the transmission of data in an uplink occupying a fifth frequency band, the fourth and fifth frequency bands being separated by a sixth frequency band, the third frequency band lying in the fifth frequency band and the sixth frequency band lying in the first frequency band, the data transmitted and received being in accordance with a first and/or second standard, wherein said method causing the cable modem to perform:

setting the cable modem in the second operating mode,
   analysing the signals included in at least the part of the fifth frequency band comprising the third frequency band,
   determining whether signals analysed are not signals in accordance with the first or second standard,
   setting the cable modem in a data transmission and reception mode according to the second standard if signals analysed are not signals in accordance with the first and second standards and are not included in the third frequency band.

2. Method according to claim 1, wherein the analysis of the signals is carried out in the part of the fifth band comprising the third frequency band and the frequencies higher than the third frequency band.

3. Method according to claim 2, wherein the cable modem is set in the first operating mode and in the data transmission and reception mode according to the first standard if the frequency band occupied by the signals analysed that are not signals in accordance with the first and second standards is higher than a first predetermined frequency-band value of the part of the fifth band comprising the third frequency band and the frequencies higher than the third frequency band.

4. Method according to claim 1, wherein said method causing the cable model to perform:

analysing the signals included in the fourth frequency band,
   determining whether signals analysed are not signals in accordance with the first or second standard.

5. Method according to claim 4, wherein setting the cable modem in the second operating mode and the data transmission and reception mode according to the second standard is further performed if the frequency band occupied by the signals analysed that are not signals in accordance with the first and second standards is lower than the first predetermined frequency-band value of the part of the fifth band comprising the third frequency band and the frequencies higher than the third frequency band and if the frequency band occupied by the signals analysed that are not signals in accordance with the first and second standards is lower than a second predetermined frequency-band value of the fourth frequency band, and the cable modem is set in the first operating mode and in the data transmission and reception mode according to the first standard if the frequency band occupied by the signals analysed that are not signals in accordance with the first and second standards is higher than the second predetermined frequency-band value of the fourth frequency band.

6. Method according to claim 1, wherein said method causing the cable modem to perform:

seeking a downlink primary channel of one of the standards, the downlink primary channel making it possible to obtain information making it possible to map the channels of the fourth frequency band and of the fifth frequency band, mapping the fourth and fifth frequency bands.

7. Method according to claim 1, wherein said method causing the cable modem to perform transferring information representing the signals analysed.

8. Method according to claim 7, wherein setting the cable modem in the second operating mode is carried out on reception of a command from terminal equipment.

9. Method according to claim 1, wherein setting the cable modem in a data transmission and reception mode according to the first or second standard is determined by the cable modem.

10. Method according to claim 1, wherein the first standard is the DOCSIS 3.0 standard and the second standard is the DOCSIS 3.1 standard.

11. A device for selecting an operating mode of a cable modem between first and second operating modes, the first operating mode allowing reception of data in a downlink occupying a first frequency band and the transmission of data in an uplink occupying a second frequency band, the first and second frequency bands being separated by a third frequency band, the second operating mode allowing the reception of data in a downlink occupying a fourth frequency band and the transmission of data in an uplink occupying a fifth frequency band, the fourth and fifth frequency bands being separated by a sixth frequency band, the third frequency band lying in the fifth frequency band and the sixth frequency band lying in the first frequency band, the data transmitted and received being in accordance with a first and/or second standard, wherein the device is included in the cable modem and comprising circuitry causing the device to implement:

setting the cable modem in the second operating mode, analysing the signals included in at least the part of the fifth frequency band comprising the third frequency band, determining whether signals analysed are not signals in accordance with the first or second standard, setting the cable modem in a data transmission and reception mode according to the second standard if signals analysed are not signals in accordance with the first and second standards and are not included in the third frequency band.

12. A non-transitory storage medium, that stores a computer program comprising instructions for implementation, by a device comprising a processor, of the method according to claim 1 when said program is executed by the processor of said device.

* * * * *